United States Patent
Jeong et al.

(10) Patent No.: US 7,540,186 B2
(45) Date of Patent: Jun. 2, 2009

(54) GAUGE FOR MEASURING AN AMOUNT OF PRECIPITATION

(75) Inventors: Ki-Deok Jeong, Seoul (KR); Kyung-Yeub Nam, Gyeonggi-do (KR); Ki-Ho Chang, Seoul (KR); Sung-Nam Oh, Seoul (KR); Hyo-Sang Chung, Gyeonggi-do (KR); Byoung-Cheol Choi, Seoul (KR)

(73) Assignee: Korea Meteorological Administration, Seoul (KR)

( * ) Notice: Subject to any disclaimer, the term of this patent is extended or adjusted under 35 U.S.C. 154(b) by 0 days.

(21) Appl. No.: 12/026,482

(22) Filed: Feb. 5, 2008

(65) Prior Publication Data
US 2008/0184788 A1    Aug. 7, 2008

(30) Foreign Application Priority Data
Feb. 6, 2007 (KR) .................. 10-2007-0012295

(51) Int. Cl.
*G01W 1/00* (2006.01)
(52) U.S. Cl. ................ 73/170.21; 73/170.17
(58) Field of Classification Search .. 73/170.01–170.28
See application file for complete search history.

(56) References Cited

U.S. PATENT DOCUMENTS

| | | | | |
|---|---|---|---|---|
| 5,413,003 A | * | 5/1995 | Waite et al. | 73/170.18 |
| 5,496,112 A | * | 3/1996 | Browne | 374/54 |
| 6,044,699 A | * | 4/2000 | Greenblatt et al. | 73/170.17 |

FOREIGN PATENT DOCUMENTS

JP        57208484 A    *  12/1982

* cited by examiner

*Primary Examiner*—Andre J Allen
*Assistant Examiner*—Jermaine Jenkins

(57) ABSTRACT

A gauge for measuring an amount of precipitation includes first and second storage tanks each having an opened upper end and a lower end formed with a drain hole, a rainwater feeding unit to selectively feed rainwater into one of the first and second storage tanks for a predetermined time, rainwater discharge units connected to both ends of the rainwater feeding unit, respectively, to open the drain hole of one of the storage tanks into which rainwater is no longer fed, measuring devices to measure the weight of rainwater stored in the first storage tank and the second storage tank, respectively, and a data storage device to store data about the weight of rainwater measured by the measuring devices in real time.

6 Claims, 3 Drawing Sheets

GAUGE FOR MEASURING AN AMOUNT OF PRECIPITATION

CROSS-REFERENCE TO RELATED APPLICATION

The benefit of priority is claimed to Republic of Korea Patent Application No. 10-2007-0012295, filed Feb. 6, 2007, which is incorporated by reference herein.

TECHNICAL FIELD

The present discussion relates to a gauge for measuring an amount of precipitation, and more particularly, to a gauge for measuring an amount of precipitation, which can more accurately measure the amount of rainfall on a rainy day.

BACKGROUND

Generally, a rain gauge is used to measure rainfall or snowfall as constituent weather conditions representing the state of the atmosphere. A conventional example of the rain gauge is configured such that the depth of rainwater collected in a cylindrical vessel having a diameter of 20 cm is expressed in millimeters.

There are various kinds of rain gauges including a cylindrical storage rain gauge, self-registering storage rain gauge, tipping-bucket rain gauge, weighing rain gauge, load-cell rain gauge, etc. These rain gauges are classified by whether they utilize a weight-measuring method or a volume-measuring method. Of the above mentioned rain gauges, the cylindrical storage rain gauge and the self-registering storage rain gauge utilize a volume-measuring method, and the tipping-bucket rain gauge, the weighing rain gauge, and the load-cell rain gauge utilize a weight-measuring method.

According to a recommendation of the World Meteorological Organization (WMO), with respect to data measured by a current universally-used Automated Surface Observing System (ASOS), the minimum measuring unit of rainfall is 0.2 mm, and more preferably, is 0.1 mm. On the basis of the recommendation of the WMO, for example, tipping-bucket rain gauges, having a resolution on the level of 0.1 mm or 0.5 mm, have been used most frequently in the measurement of rainfall using the Automated Surface Observing System installed/managed by the Korea Meteorological Administration. However, other tipping-bucket rain gauges, having a resolution on the level of 0.2 mm or 1.0 mm, are also used in associated organizations.

In Korea, two tipping-bucket rain gauges, which have a resolution on the level of 0.1 mm and 0.5 mm, respectively, have been installed and managed in meteorological observation stations. Specifically, since Jan. 23, 2002, a tipping-bucket rain gauge on the level of 0.1 mm has been used when the accumulated amount of rainfall is less than 0.5 mm, and a tipping-bucket rain gauge on the level of 0.5 mm has been used when the accumulated amount of rainfall is more than 0.5 mm. However, this is far from satisfactory in consideration of the recommendation of the WMO.

Another example of rain gauges utilizing the weight-measuring method includes a 200 mm-capacity weighing rain gauge using a load-cell. The 200 mm-capacity weighing rain gauge, however, has a problem in that it should be forcibly drained if the amount of rainwater collected in the rain gauge reaches the maximum capacity of the rain gauge. Another problem of the weighing rain gauge is that it may have a measurement error when the load-cell is affected by wind load on a windy day.

Meanwhile, it has been found that the Automated Surface Observing system has degradation in the accuracy of values measured by the tipping-bucket rain gauge as the intensity of rainfall gradually increases. To solve this problem, recently, weighing rain gauges have been mainly used in America and Europe. As reported in results of a field test by the Royal Netherlands Meteorological Institute (KNMI), weighing rain gauges have several advantages in that they can rapidly sense solid rainfall and are less sensitive to impurities and thus, can reduce an error in the measurement of rainfall due to the interference of insects, leaves of trees, dusts, excrement of birds, etc., and also, the weighing rain gauges use a more simplified measuring method and have an ease in the removal and repair/maintenance thereof as compared to electronic rain gauges. However, it was also reported that the weighing rain gauges still suffer from a measurement error due to wind, and are inappropriate to measure rainfall in the open air.

Here, considering the configuration of a conventional tipping-bucket rain gauge currently used in the Meteorological Administration, it uses a weight-measuring method in which rainwater entering a hole at the top of the rain gauge is collected in two triangular buckets by passing through tubes and the two buckets are alternately tipped like a seesaw to operate a lead switch for recording the amount of rainfall. Once one of the buckets is filled with a predetermined amount of rainwater, the bucket is tipped downward to drain the rainwater filled in the bucket. Then, the other bucket will be filled with rainwater. With this design, since it takes a time of about 0.3 second to alternate one bucket with the other bucket, there is a problem in that rainwater is directly drained during the time of about 0.3 second without being filled in any one of the buckets, thereby causing an error in the measurement of rainfall. Accordingly, the tipping-bucket rain gauge has a problem in that it measures a smaller amount of rainfall than the actual amount of rainfall. In operation of a conventional example of the tipping-bucket rain gauge, once rainwater enters a discharger through a rainwater reservoir, the rainwater is collected in triangular buckets (i.e. water sumps) through drain tubes. If the level of the collected rainwater in one of the buckets reaches 0.5 mm or 0.1 mm, the bucket is tipped by the weight of the collected rainwater. There are provided a pair of buckets, i.e. two buckets such that the two buckets are alternately tipped to operate the lead switch (or mercury) for generating a pulse signal.

Summarizing good and bad points of the tipping-bucket rain gauge depending on an observation resolution thereof, a rain gauge having a resolution on the level of 0.1 mm is efficient to precisely measure the amount of rainfall up to 0.1 mm when the amount and intensity of rainfall is small and low. On the other hand, a rain gauge having a resolution on the level of 0.5 mm has a function of measuring rainfall only at the unit of 0.5 mm and cannot measure a medium-level unit of, for example, 0.1~0.4 mm, 0.6~0.9 mm, etc. Furthermore, when the intensity of rainfall increases upon a heavy rain, the tipping-bucket rain gauge has a shortened tipping period, and suffers from an excessive measurement error.

Meanwhile, in the case of a conventional self-registering storage rain gauge (of a siphon type), once rainwater is introduced into a storage tank through a water reservoir, a float received in the tank is raised according to the level of rainwater, thereby allowing the amount of rainwater to be recorded by a pen connected to a shaft of the float. Then, if the level of rainwater reaches 20 mm, the tank is automatically opened through a siphon such that the level of rainwater in the tank is lowered down to a graduation of zero.

In use of the conventional self-registering storage rain gauge, it should be noted that the storage rain gauge should be previously subjected to a siphon test before it rains because a basic amount of rainwater remained in the storage tank will be evaporated after a long spell of dry weather. Further, since it takes a time of about 16 seconds to drain a rainfall of 20 mm through the siphon, it is impossible to measure rainfall during 16 seconds. Another problem of the self-registering storage rain gauge is that a predetermined amount of rainwater always stored in the storage tank is frozen in winter and cannot be used.

As will be understood from the above description, there is a need to develop a rain gauge capable of solving the above described problems of the conventional tipping-bucket rain gauge and storage rain gauge and taking only advantages of these gauges, in order to achieve a more accurate measurement of rainfall.

SUMMARY

Therefore, in view of the above and other problems, it is an object of the present discussion to provide a gauge for measuring an amount of precipitation, which can solve not only errors of a tipping-bucket rain gauge due to a frequent alternation of tipping buckets upon a heavy rain, but also time errors of a self-registering storage rain gauge due to a drainage time, and can achieve several advantages such as, inter alia: reducing the time required to tip a bucket by measuring rainfall in mass units and automatically tipping the bucket by operation of a timer; increasing the measurement accuracy of rainfall by adopting an alternate draining configuration; and measuring snowfall-even in winter-with the use of a heater.

In accordance with the present discussion, the above and other objects can be accomplished by the provision of a gauge for measuring an amount of precipitation including: first and second storage tanks each having an opened upper end and a lower end formed with a drain hole; a rainwater feeding unit to selectively feed rainwater into one of the first and second storage tanks for a predetermined time; rainwater discharge units connected to both ends of the rainwater feeding unit, respectively, to open the drain hole of one of the storage tanks into which rainwater is no longer fed; measuring devices to measure the weight of rainwater stored in the first storage tank and the second storage tank, respectively; and a data storage device to store data about the weight of rainwater measured by the measuring devices in real time. If rainwater is introduced into the precipitation gauge, the rainwater feeding unit is tipped toward any one of the first and second storage tanks, to feed rainwater into the storage tank. Then, one of the measuring devices associated with the storage tank, into which the rainwater was fed, measures the weight of rainwater stored in the storage tank, and transmits the measured data to the data storage device. The data storage device converts the transmitted data into the accumulated height value of rainwater, and stores the converted data. In this way, the amount of rainwater stored in the respective first and second storage tanks can be easily measured. Also, if rainwater is no longer fed into the storage tank, the drain hole of the storage tank is opened by the associated discharge unit, to rapidly discharge the rainwater.

Preferably, the rainwater feeding unit may include: a bucket to perform a seesaw movement above the first and second storage tanks, such that it is tipped toward one of the first and second storage tanks to allow the movement of rainwater; and a timer converter drive installed at the bucket, to provide the bucket with an operating power such that a tipping direction of the bucket is automatically changed toward a specific one of the first and second storage tanks by a predetermined time interval. Once rainwater is introduced into the precipitation gauge, the rainwater is moved along the tipped bucket. Here, a tipping direction of the bucket is rapidly changed by a predetermined time interval under the operation of a timer. Thereby, the rainwater can be moved alternately into any one of the storage tanks.

Preferably, each of the rainwater discharge units may comprise: an opening/closing member made of a soft material and used to open or close the drain hole of an associated one of the first and second storage tanks; and a connecting wire provided to connect the opening/closing member to a bottom surface of the bucket. When the bucket is tipped such that one end thereof is lowered and the other end is raised, the opening/closing member connected to the bottom surface of the raised end of the bucket is separated from the drain hole, thereby allowing the rainwater to be rapidly discharged to the outside.

Preferably, the gauge for measuring an amount of precipitation further comprises a heater to melt snow in winter, so as to allow the measurement of snowfall.

BRIEF DESCRIPTION OF THE DRAWINGS

The above and other objects, features and advantages advantages of the present precipitation gauge invention will be more clearly understood from the following detailed description taken in conjunction with the accompanying drawings, in which.

DETAILED DESCRIPTION

Hereinafter, example embodiments of a gauge for measuring an amount of precipitation are described with reference to the accompanying drawings.

Figure 1:
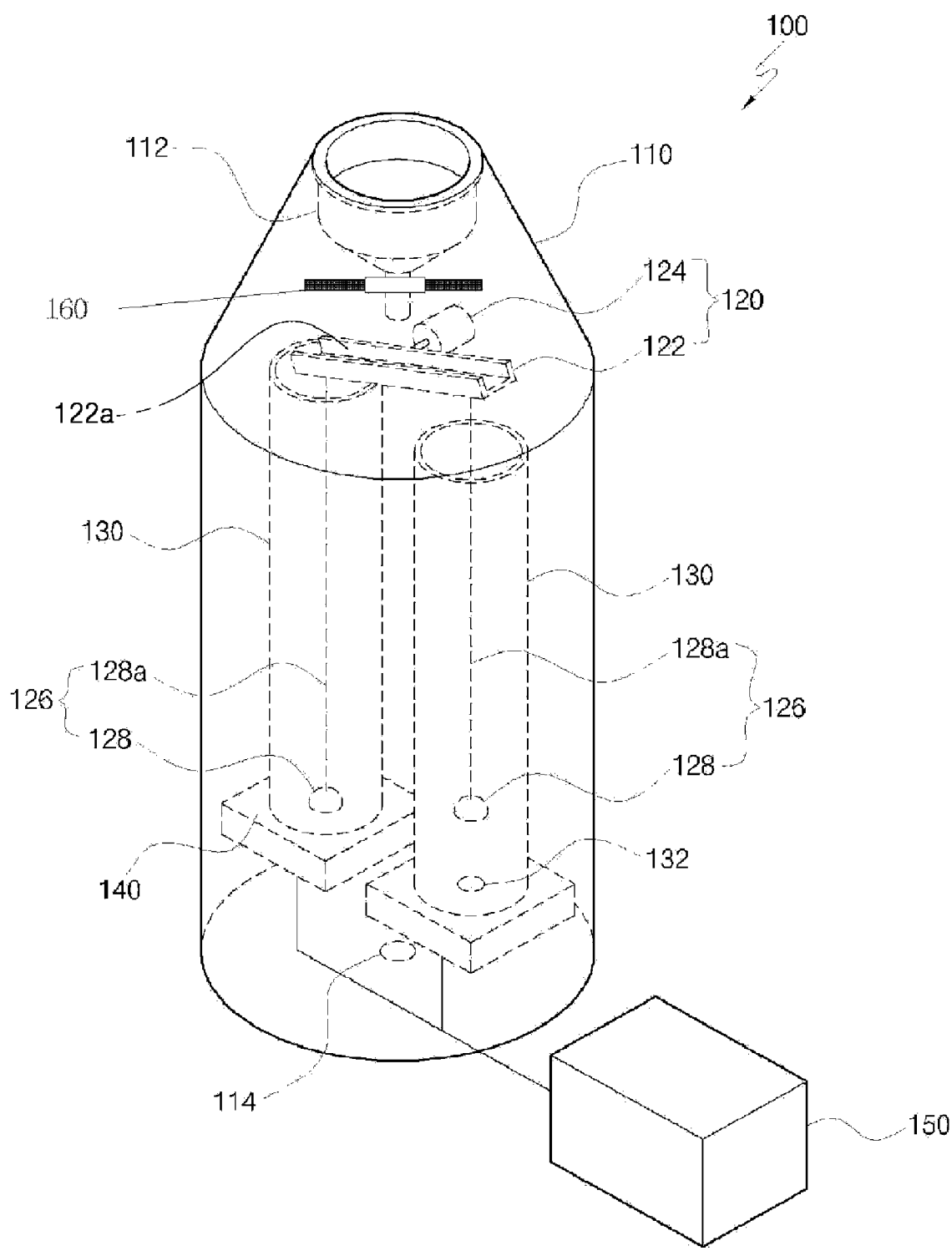
FIG. 1 is a perspective view illustrating a gauge for measuring an amount of precipitation according to an embodiment.
Figure 2A:
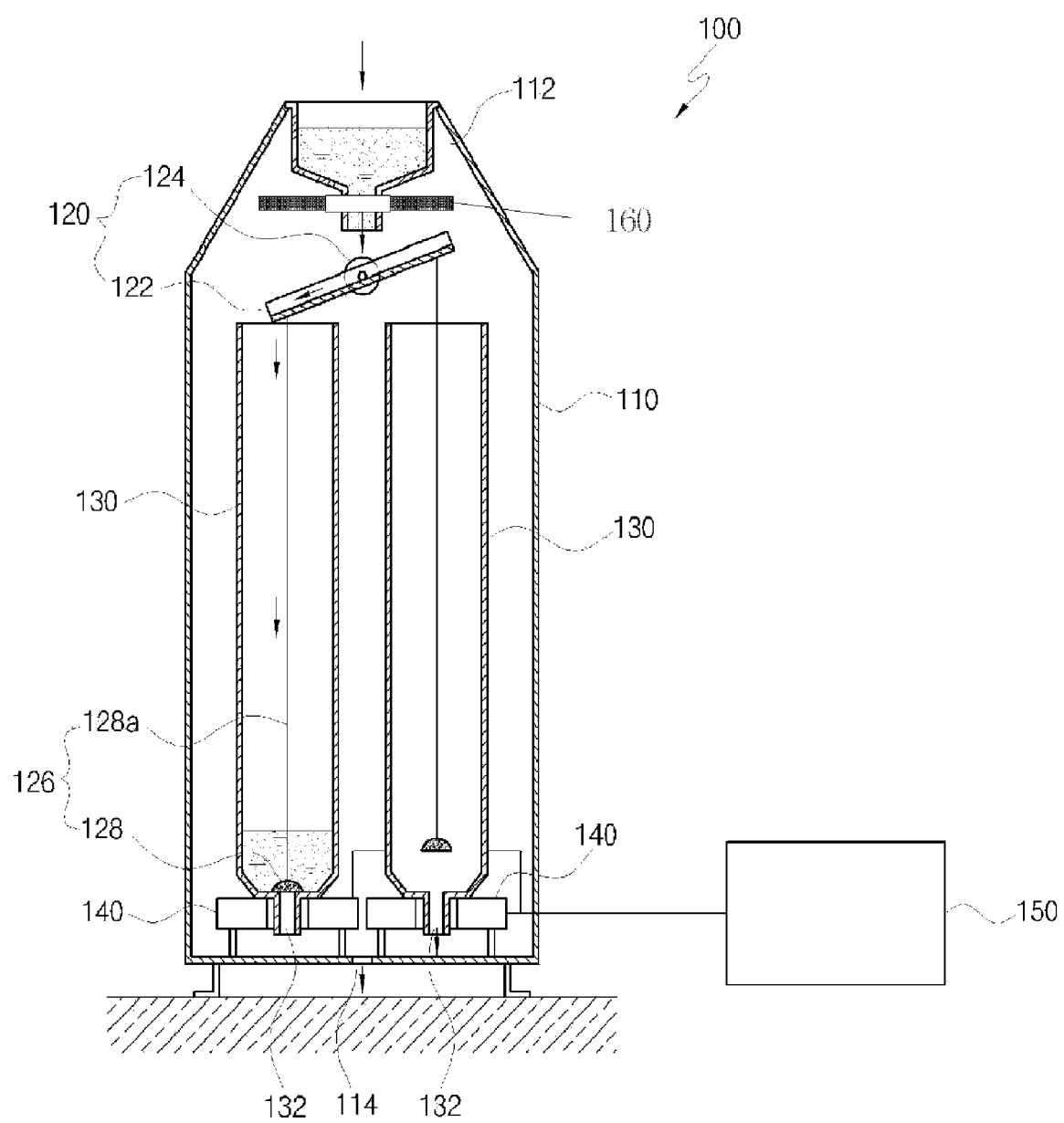
FIGS. 2A and 2B are sectional views illustrating the operation of the gauge for measuring an amount of precipitation shown in FIG. 1.
Figure 2B:
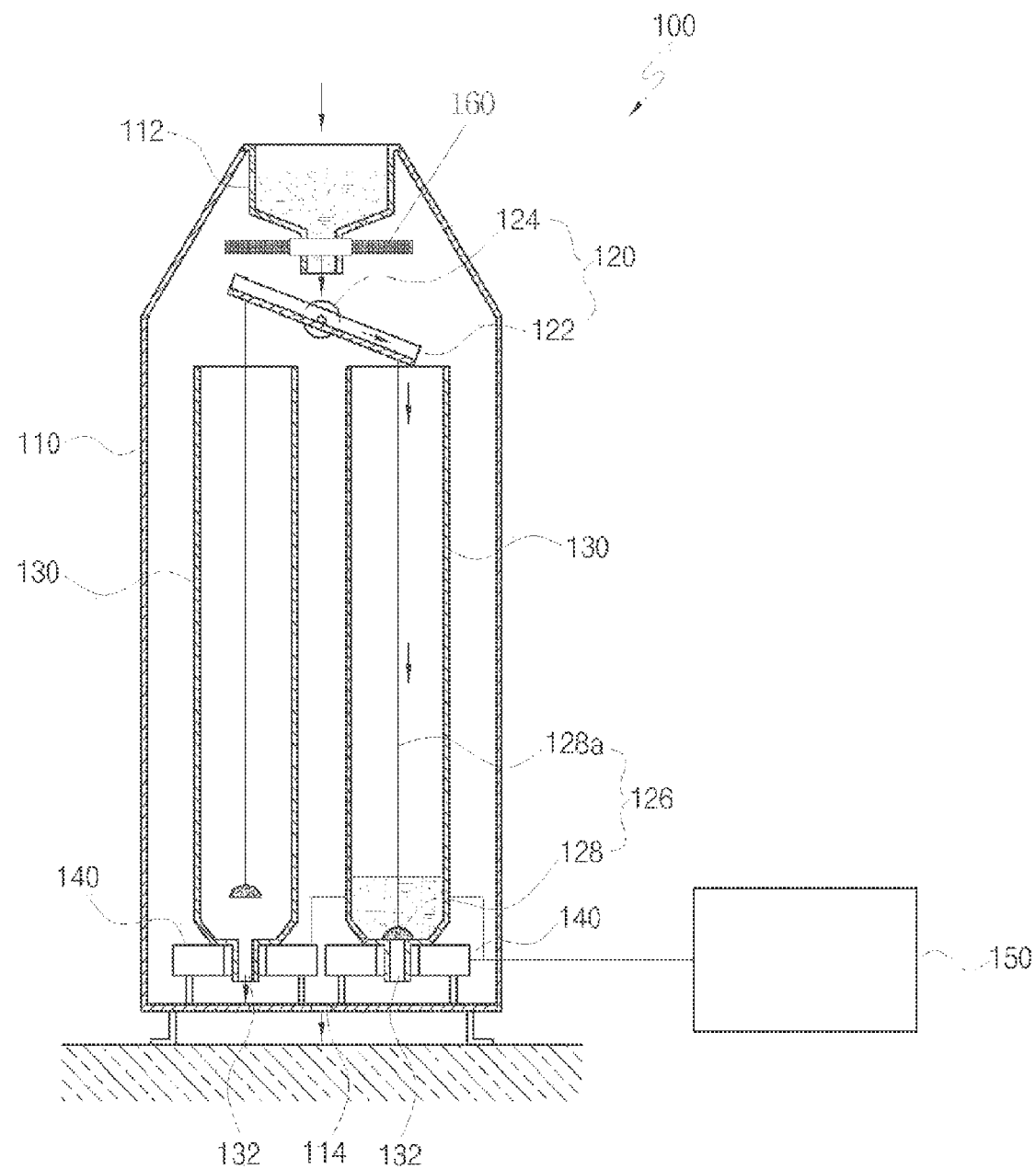

The gauge for measuring an amount of precipitation according to a first example embodiment, as shown in FIG. 1 and FIGS. 2A and 2B, includes: a main tank 110; a rainwater feeding unit 120; rainwater discharge units 126; at least first and second storage tanks 130; measuring devices 140; a data storage device 150; and a heater 160.

The main tank 110 includes a truncated-conical entrance region having an open upper end, the cross sectional area of the entrance region gradually increasing downward, and a cylindrical body region having a constant cross sectional area equal to the maximum cross sectional area of the entrance region. The main tank 110 is perforated, in the bottom thereof, with a discharge hole 114, to discharge rainwater, having passed through the first and second storage tanks 130, which will be described hereinafter, to the outside.

Provided at the open upper end of the main tank 110 is a funnel-shaped collector 112 having a function of guiding the introduction of rainwater.

The rainwater feeding unit 120 has a function of selectively feeding the introduced rainwater into any one of the first and second storage tanks 130 every hour. The rainwater feeding unit 120 includes a bucket 122, and a timer converter drive 124.

The bucket 122 has a flow path (122a) that has a V-shaped cross section and extends horizontally. In consideration of the fact that the bucket 122 has to be tipped toward a direction to feed the rainwater into any one of the pair of first and second storage tanks 130, the bucket 122 must have a shorter length than the total arrangement length of the first and second storage tanks 130.

The timer converter drive 124 is attached to the center of a sidewall of the bucket 122. If electric power is applied to the timer converter drive 124, the timer converter drive 124 operates the bucket 122 such that the bucket 122 performs a seesaw movement to be tipped alternatingly toward one of the storage tanks 130 by a predetermined time interval under operation of a timer received in the timer converter drive 124.

Here, a rotating angle of the timer converter drive 124 is set such that the bucket 122 is always tipped to any one of preset positions.

The rainwater discharge units 126 are connected to both ends of the rainwater feeding unit 120, and are used selectively to open a drain hole 132 of one of the storage tanks 130 into which rainwater is no longer fed. Each of the rainwater discharge units 126 includes an opening/closing member 128, and a connecting wire 128a.

The opening/closing member 128 is made of, for example, soft rubber, to open or close the drain hole 132 of the first or second storage tank 130.

The connecting wire 128a is provided to connect the opening/closing member 128 with an associated end of a bottom surface of the bucket 122. When the bucket 122 is tipped such that both ends of the bucket 122 are at different heights from each other, the opening/closing member 128 of one of the rainwater discharge units 126, which is connected to the low-height end of the bucket 122, closes the drain hole 132 of one storage tank 130 under the influence of a water pressure, and the opening/closing member 128 of the other rainwater discharge unit 126, which is connected to the high-height end of the bucket 122, is separated away from the drain hole 132 of the other storage tank 130.

The main tank 110 receives a pair of the first and second storage tanks 130 each having an opened upper end and a lower end having the drain hole 132.

The measuring devices 140 are electronic scales capable of measuring rainwater accurately to 0.01 g. The measuring devices 140 are installed to come into contact with bottom surfaces of the first and second storage tanks 130, respectively. The measuring devices 140 measure the weight of rainwater stored in the first and second storage tanks 130, respectively, and output the measured weight values.

The data storage device 150 stores data about the amount of rainwater measured by the measuring devices 140 in real time. The data storage device 150 converts the unit value of rainwater from grams into millimeters, and consequently, converts the weight of rainwater into the accumulated height of rainwater, and stores the converted data. Here, the data storage device 150 can be connected with a notebook or personal computer if necessary.

The heater 160 is provided at a lower end of the collector 112. The heater 160 serves as a heat source in winter to melt snow collected in the collector 112, to enable the measurement of snowfall in the same manner as the measurement of rainfall. For this, a contact of the heater 160 is switched on at the temperature of 4° C., and is switched off at the temperature of 15° C.

Now, the operation of the gauge for measuring an amount of precipitation in accordance with the present embodiment will be described with reference to FIG. 1 and FIGS. 2A and 2B. First, if it rains, rainwater is introduced into the precipitation gauge 100 through the collector 112.

Next, the introduced rainwater, having passed through the collector 112, is stored in the first storage tank 130 along the tipped bucket 122 of the rainwater feeding unit 120. In this case, the drain hole 132 of the first storage tank 130 is kept in a closed state by the opening/closing member 128 of the associated discharge unit 126.

Then, the weight of the rainwater stored in the first storage tank 130 is precisely measured by use of an associated one of the measuring devices 140 as an electronic scale capable of measuring the weight of rainwater accurately to 0.01 g.

The measured weight value of the rainwater is transmitted to the data storage device 150 in real time. The data storage device 150 stores the accumulated height value of rainwater by converting the weight of rainwater in the unit of grams into the accumulated height of rainwater in the unit of millimeters.

After the amount of rainwater is continuously measured for a predetermined time, the timer converter drive 124 is operated to rapidly change the tipping direction of the bucket 122 such that the bucket 122 is tipped toward the second storage tank 130. Similarly, the weight of rainwater stored in the second storage tank 130 can be measured by the other measuring device 140, and the measured weight value can be transmitted to the data storage device 150. In this case, the drain hole 132 of the second storage tank 130 is kept in a closed state by the opening/closing member 128 of the other rainwater discharge unit 126, and the rainwater stored in the first storage tank 130 is discharged to the outside through the discharge hole 114 of the main tank 110.

Here, the operation of the timer converter drive 124 is automatically performed by a predetermined time interval. If rainwater is no longer fed into the storage tank, the storage tank is drained simultaneously with the operation of the timer converter drive 120. In this way, the precipitation gauge according to the present discussion can continuously measure rainfall without an error even during a long, continuous rain.

As apparent from the above description, the present discussion provides an gauge for measuring an amount of precipitation capable of solving not only errors associated with tipping-bucket rain gauges due to frequent alternation of tipping buckets depending on the intensity of rainfall, but also time errors associated with self-registering storage rain gauges due to drainage time. The gauge for measuring an amount of precipitation according to the present discussion has the effect of measuring the weight of rainwater, thereby providing accurate weather information on rainy days.

Although example embodiments of the present discussion have been disclosed for illustrative purposes, those skilled in the art will appreciate that various modifications, additions and substitutions are possible, without departing from the scope and spirit of the invention as set forth in the accompanying claims.

What is claimed is:

1. A gauge for measuring an amount of precipitation, comprising:
   first and second tanks having an entrance respectively, the precipitation being fed to the first and second tanks through the entrances respectively;
   a feeding unit configured to selectively feed the precipitation into one of the first and second tanks.

2. The gauge for measuring an amount of precipitation according to claim 1, wherein the feeding unit comprises:
   a bucket having a flow path through which the precipitation flows, one end of the flow path being disposed so that the one end of the flow path is close to the entrance of the first tank, the other end of the flow path being disposed so that the other end of the flow path is close to the entrance of the second tank; and
   a converter drive connected to the bucket, the converter drive configured to selectively move the one end of the flow path to the entrance of the first tank or the other end of the flow path to the entrance of the second tank.

3. The gauge for measuring an amount of precipitation according to claim 2, wherein a respective drain hole is formed on a respective lower end of the first and the second tanks, the gauge further comprising:
a first opening/closing member connected to one end of the bucket corresponding to the one end of the flow path and opening/closing the drain hole of the first tank; and
a second opening/closing member connected to the other end of the bucket corresponding to the other end of the flow path and opening/closing the drain hole of the second tank.

4. The gauge for measuring an amount of precipitation according to claim 3, further comprising a measuring device to measure an respective amount of the precipitation that is stored in the first and the second tank.

5. The gauge for measuring an amount of precipitation according to claim 1, further comprising a collector collecting the precipitation and feeding the precipitation to the feeding unit.

6. The gauge for measuring an amount of precipitation according to claim 5, further comprising a heater heating the collector.

* * * * *